Oct. 5, 1937.   S. W. MASTERS   2,095,145
ANIMAL TRAP
Filed Jan. 13, 1937   3 Sheets-Sheet 1

Inventor
Sib W. Masters

By Clarence A. O'Brien
Hyman Berman
Attorneys

Oct. 5, 1937.    S. W. MASTERS    2,095,145
ANIMAL TRAP
Filed Jan. 13, 1937    3 Sheets-Sheet 2

Inventor
Sib W. Masters

By Clarence A. O'Brien
Hyman Berman
Attorneys

Oct. 5, 1937. S. W. MASTERS 2,095,145
ANIMAL TRAP
Filed Jan. 13, 1937 3 Sheets-Sheet 3

Inventor
Sib W. Masters
By Clarence A. O'Brien
Hyman Berman
Attorneys

Patented Oct. 5, 1937

2,095,145

UNITED STATES PATENT OFFICE 2,095,145

ANIMAL TRAP

Sib W. Masters, Livingston, Tenn.

Application January 13, 1937, Serial No. 120,437

3 Claims. (Cl. 43—88)

This invention relates to animal traps and an object of the invention is to provide a trap of this character which may be suspended from a tree or analogous support and is so equipped as to embrace the neck of the animal for restraining the latter in a manner insuring against choking the animal to death.

A further object of the invention is to provide a trap which will be positive and efficient in operation and which will serve admirably for trapping animals without doing bodily harm thereto.

The invention together with its objects and advantages will be best understood from a study of the following description taken in connection with the accompanying drawings wherein:—

Figure 3 is a perspective view of a catch device hereinafter more fully referred to.

Figure 4 is a perspective view of a ring member hereinafter more fully referred to.

Figure 1:
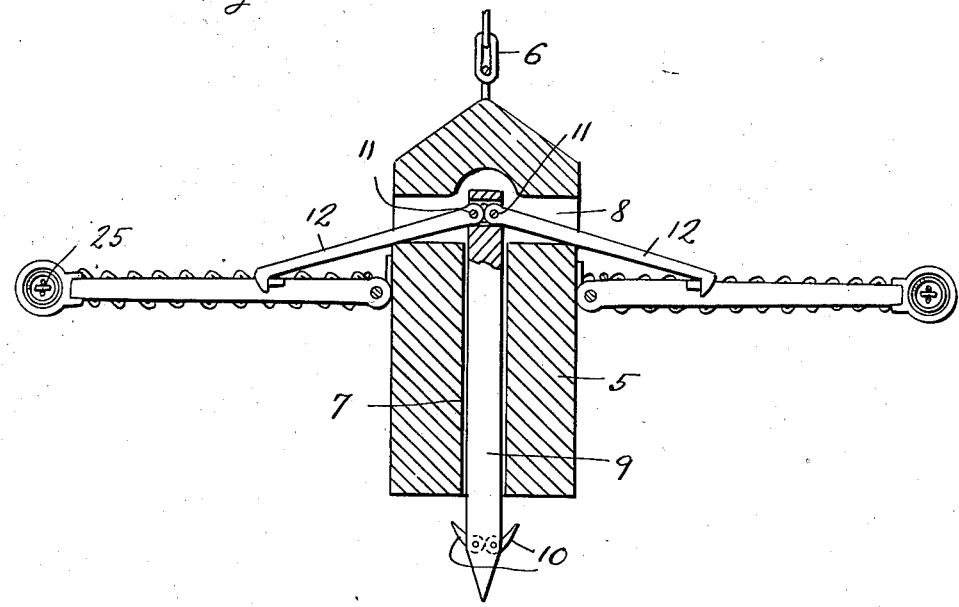
Figure 1 is a vertical sectional view through the trap when set.

Referring to the drawings by reference numerals it will be seen that in the preferred embodiment thereof the trap comprises a center or body block 5 that at its upper end is equipped as at 6 for suspension from the limb of a tree or similar support.

The block 5 is provided with a vertical opening 7 that extends longitudinally of the block from a point inwardly from the upper end of the block to the lower end of the block. Adjacent the upper end of the opening 7 the block is provided with, in the present instance four lateral openings 8.

Slidably accommodated in the opening or bore 7 a bait supporting prong 9 that at its lower free end is provided with pivoted hooks 10 that serve to retain the bait in position on the lower end of the prong 9.

At its upper end the prong 9 is suitably provided to pivotally accommodate therein as at 11 one end of latch members 12 that work in the openings 8.

To each of the four sides of the member 5 there is hinged an arm 14.

Each arm 14 at one end is provided with an opening through which extends a hinge pin 15 the opposite ends of which are imbedded in the block 5.

Each arm 14 is normally urged downwardly to a vertical position through the medium of a spring 16 an intermediate portion of which extends transversely across the upper side of the arm 14 and the respective opposite ends of which are coiled about the pin 15 with the terminals of said ends bearing against the block 5.

Intermediate their ends the arms 14 are provided with keeper lugs 17 with which are engaged the hook ends of the latch members 12 in a manner shown in Figure 1 for releasably holding the arms 14 in a substantially horizontal position.

For each arm 14 there is provided a ring member 18 that has a pair of spaced lugs 19 projecting therefrom to accommodate therebetween the free end of an arm 14.

Trained through the rings 18 is a coil spring 20 one end of which is hooked in an opening 21 provided in one end of the plate or body member 22 of a latch structure indicated generally by the reference numeral 23. The relatively opposite end of the coil spring 20 is hooked into an opening 24 provided at the relatively opposite end of the plate 22 of device 23.

Trained through the spring 20 is a flexible member 25 of any suitable length. In the present instance the member 25 is in the form of a chain and one end thereof is engaged in the opening 24 of the plate 22 of member 23. The other end portion of the chain or flexible member 25 is trained through a suitable opening 27 provided in the plate 22 and is anchored or otherwise secured to a post or the like 27' driven into the ground at a point remote from the tree or other support from which the trap is suspended.

Figure 2:
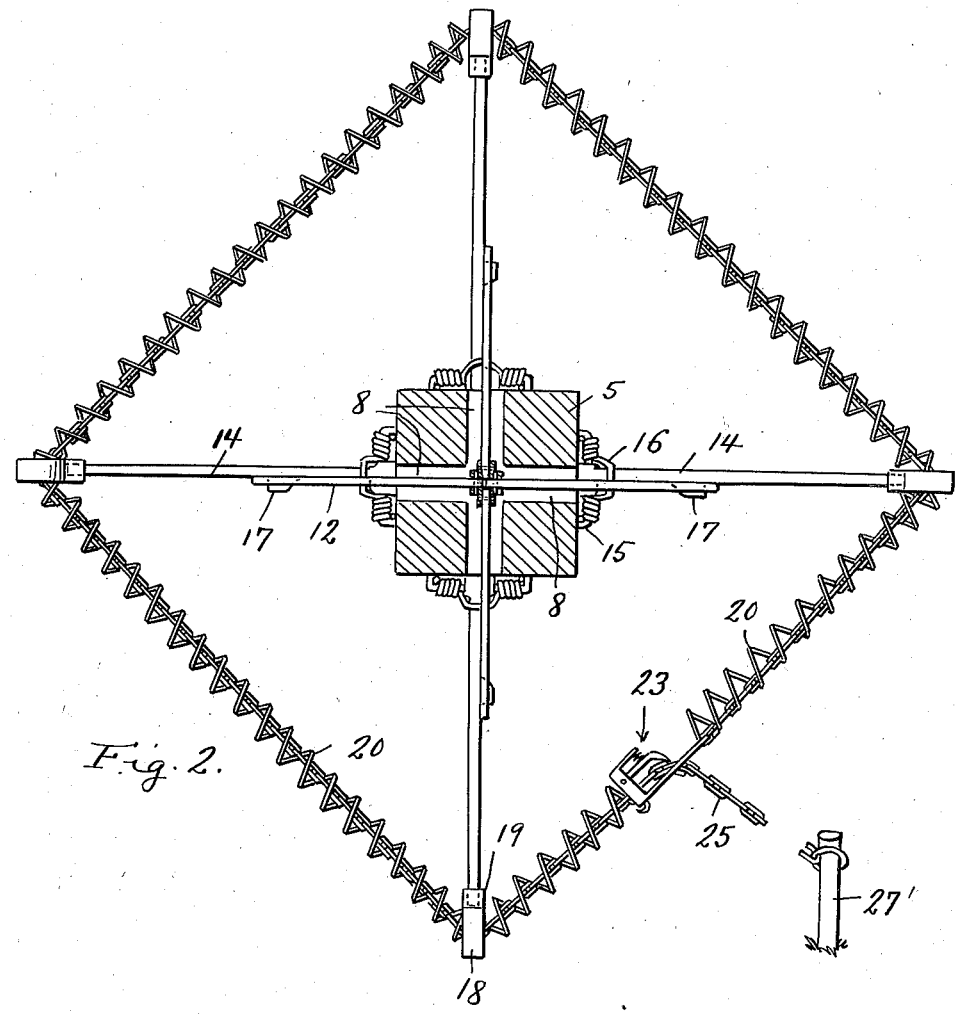
Figure 2 is a plan view of the trap, set, and with certain parts shown in transverse section.
Figure 4:
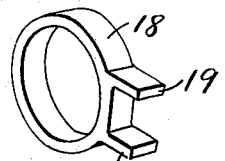

At one end of the plate 22 there is formed integral with the plate an arch 28 between the sides of which is pivoted as at 29 a keeper dog 30 that engages the links of the chain 25 in a manner as clearly shown in Figure 2 to prevent drawing of the chain through the opening 27 in the direction necessary to expand the neck embracing device after it has once been contracted about the neck of the animal. In this connection it will be understood, however, that by positive swinging of the dog 30 upwardly out of engagement with the chain, said chain can be reversely drawn through the opening 27.

Figure 3:
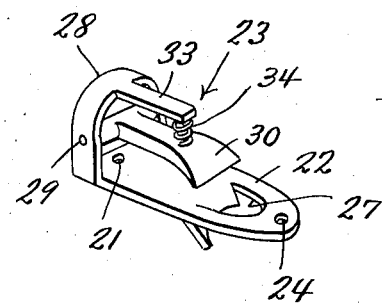

For releasably urging the dog 30 of the member 23 into engagement with the chain there is provided integral with the arch 28 an arm 33 to which is connected one end of a spring 34, the other end of the spring being suitably connected with the dog 30 as shown in Figure 3.

When set the trap appears as shown in Figure 2. That is to say, with the arm 14 in the raised horizontal position, latch members 12 engaged with the keeper lugs 17 and the rings 18 on the outer free ends of the arms 14 with the spring 20 in expanded conditions and one end of the chain 25 anchored to the post 27, the bait 35 is impaled on the hooks 10 of the member 9 as shown in Figure 5.

Figures 5, 6:
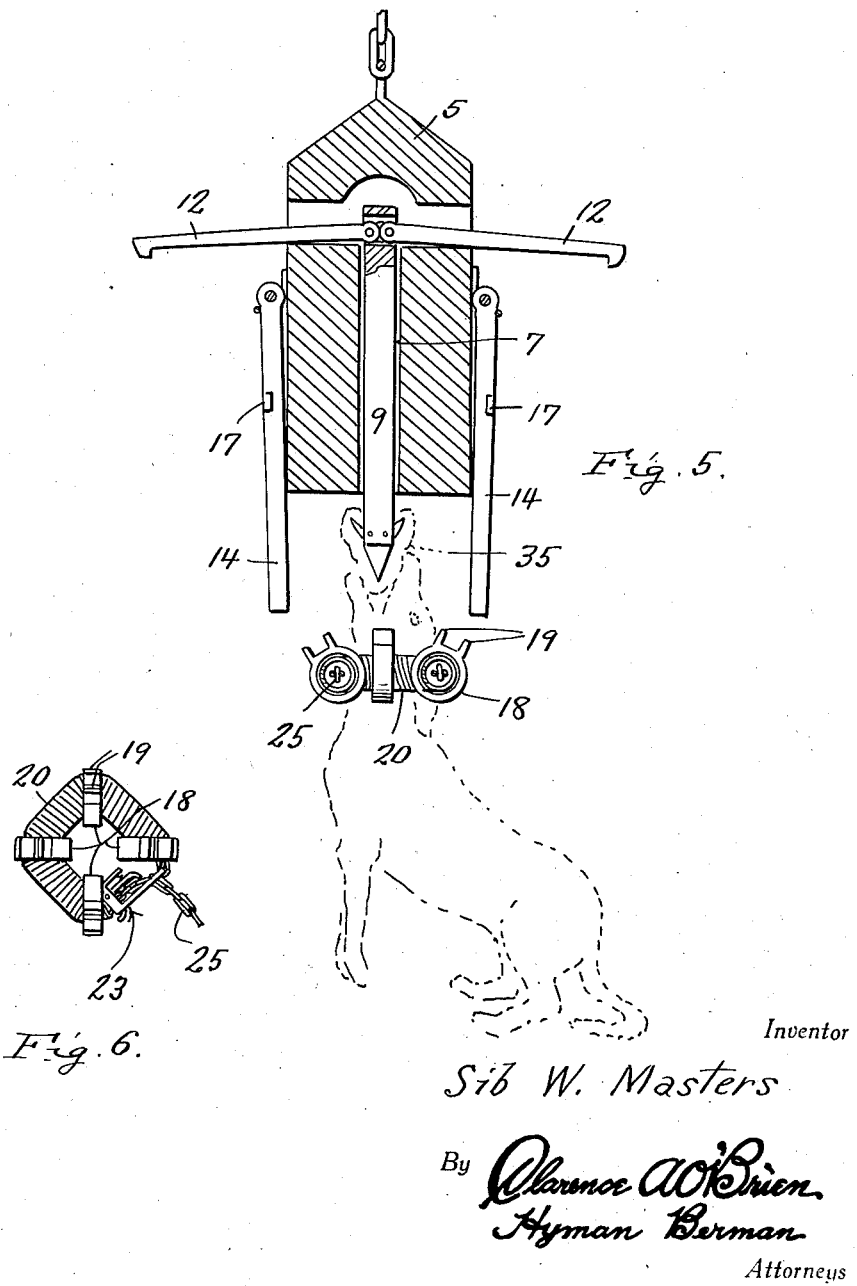
Figure 5 is a sectional view illustrating the manner in which the trap operates when sprung and Figure 6 is a plan view of the neck encircling portion of the trap, said part of the trap being shown in contracted condition.

It will thus be seen, and as suggested in Figure 5 that when the animal reaches up to grab the bait 35 a downward pull will be exerted on the member 9. This downward pull on the member 9 will cause the latch arms 12 to raise upwardly out of engagement with the lugs 17 releasing the arms 14. Thus released arms 14 fall to the vertical position shown in Figure 5 with the result that the rings 18 drop off of the free ends of the arms permitting the spring 20 to contract as it drops down over the head and neck of the animal as will be clear from a study of Figure 5. Manifestly the spring 20 will contract about the neck of the animal to properly embrace the neck and at the same time to guard the animal against being choked to death as would otherwise result from the animal pulling or tugging on the chain or flexible member 25, it being understood that the springs will be of a length determined by the type or size of animal expected to be caught in the trap.

It is thought that a clear understanding of the construction, utility and advantages of the invention will be had without a more detailed description.

Having thus described the invention, what is claimed as new is:—

1. An animal trap comprising a member adapted to be suspended from the limb of a tree or analogous support, a bait suspension member slidably mounted on said member, a plurality of arms pivotally mounted at one end to each of the several sides of said member and normally adapted to swing downwardly to a vertical position, latch members pivoted at one end to the bait holding member and lugs on said pivoted arms with which said latch members are engaged for releasably holding the pivoted arms in a substantially horizontal position; a substantially annular contractible member loosely engaged with the outer free ends of said pivoted arms and held by said arms when the latter are in horizontal position in an expanded position whereby when a downward pull is exerted on the bait holding member said latch members are moved out of engagement with said pivoted arms permitting the latter to drop downwardly and said contractible annular member to drop over the head and about the neck of the animal.

2. An animal trap comprising a member adapted to be suspended from the limb of a tree or analogous support, a bait holding member slidably mounted on said member, a plurality of arms pivotally secured at one end to each of the several sides of said member and normally adapted to swing downwardly to a vertical position, latch members pivoted at one end to the bait holding member and lugs on said pivoted arms with which said latch members are engaged for releasably holding the pivoted arms in a substantially horizontal position; a substantially annular contractible member loosely engaged with the outer free ends of said pivoted arms and held by said arms when the latter are in horizontal position in an expanded position whereby when a downward pull is exerted on the bait holding member said latch members are moved out of engagement with said pivoted arms permitting the latter to drop downwardly and said contractible annular member to drop over the head and about the neck of the animal, said annular member being in the form of a coil spring, rings through which said coil spring is trained and said rings being provided with means loosely engaging the free ends of said arms.

3. An animal trap comprising a member adapted to be suspended from the limb of a tree or analogous support, a bait holding member slidably mounted on said member, a plurality of arms pivotally connected at one end to each of the several sides of said member and normally adapted to swing downwardly to a vertical position, latch members pivoted at one end to the bait holding member and lugs on said pivoted arms with which said latch members are engaged for releasably holding the pivoted arms in a substantially horizontal position; a substantially annular contractible member loosely engaged with the outer free ends of said pivoted arms and held by said arms when the latter are in horizontal position in an expanded position whereby when a downward pull is exerted on the bait holding member said latch members are moved out of engagement with said pivoted arms permitting the latter to drop downwardly and said contractible annular member to drop over the head and about the neck of the animal, said annular member being in the form of a coil spring, rings through which said coil spring is trained and said rings being provided with means loosely engaging the free ends of said arm, and a flexible member trained through said spring, said flexible member being anchored at one end to the spring and having a second end extending outwardly from the spring and adapted to be anchored at a point remote from the tree or analogous support.

SIB W. MASTERS.